US008645857B2

(12) United States Patent
Bisalputra et al.

(10) Patent No.: US 8,645,857 B2
(45) Date of Patent: Feb. 4, 2014

(54) METHOD FOR CONTROLLING INFORMATION DISPLAY

(75) Inventors: Danai Bisalputra, New Westminster (CA); David S. Kauffman, Vancouver (CA)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 1067 days.

(21) Appl. No.: 12/055,365

(22) Filed: Mar. 26, 2008

(65) Prior Publication Data

US 2009/0249243 A1 Oct. 1, 2009

(51) Int. Cl.
*G06F 3/048* (2013.01)
(52) U.S. Cl.
USPC .......................................... 715/781; 715/788
(58) Field of Classification Search
USPC ............... 715/759, 764, 76, 5, 768, 781, 788, 715/799, 800, 801
See application file for complete search history.

(56) References Cited

U.S. PATENT DOCUMENTS

| | | | |
|---|---|---|---|
| 6,667,750 B1 * | 12/2003 | Halstead et al. ............... | 715/788 |
| 7,055,097 B1 * | 5/2006 | Netsch ........................... | 715/207 |
| 8,065,628 B2 * | 11/2011 | Oshiro et al. .................. | 715/788 |
| 2002/0188632 A1 * | 12/2002 | Su .................................. | 707/513 |
| 2010/0107118 A1 * | 4/2010 | Pearce ........................... | 715/799 |

OTHER PUBLICATIONS

Microsoft XP screen caps, "XP.pdf", 2007, 5 pages.*

* cited by examiner

*Primary Examiner* — Haoshian Shih

(57) ABSTRACT

A system and method for controlling the display of multiple pieces of information in adjacent regions of a display area is presented. A user control for the interface between the regions is provided so that a single type of user input provided to the control can contextually alter various characteristics of the interface.

20 Claims, 10 Drawing Sheets

FIG. 2B (PRIOR ART)

METHOD FOR CONTROLLING INFORMATION DISPLAY

FIELD OF THE INVENTION

The present invention pertains to a user interface for controlling an information display and in particular for controlling the presentation of adjacent information.

BACKGROUND OF THE INVENTION

Many computerized applications present information in a user interface. Some applications are designed to present different information in adjacent portions of a user interface. For example, prior art imaging applications have presented two or more images adjacently in a proof layout. As another example, prior art imaging and document editing applications have a split-screen comparative views of a single image/document with one side presenting a first version view and the other side presenting a second version view. Different versions can correspond to an edit or changes to attributes that affect appearance of one of the views (e.g. version identifier and color settings).

One problem with presenting multiple pieces of information adjacently in a user interface display area is determining how to arrange the adjacent display regions and the information content within those regions to facilitate the user task. A preferred presentation may be task-dependent and/or information-dependent.

Some prior art applications have addressed the problem by providing automated solutions with limited user controls. For example, in an image editing application (e.g. FIG. 1), the display area size, image size, and magnification factor dictate what portions of the before and after images appear in their respective display regions so that together they appear as a single image stitched together from two pieces. A user may be able to control the magnification and/or relative sizes of each display region but presentation of the relevant portions of the information is automatically determined based on the size, position and the restricted orientation of the display regions.

Some prior art applications (e.g. FIG. 2A) allow the user to control more directly what portions of the information are presented in each display region. For example, each display region may have scroll bars to control selection of the relevant portions of information.

Another problem with adjacent displays is that the other characteristics of the display regions, such as orientation, may be advantageously controlled. As an example, comparing before and after edit versions of one image may be best accomplished with a side-by-side orientation for the display regions. However, for a different image, a top-to-bottom orientation for the display regions may be preferable.

Some prior art applications solve this problem by providing additional user controls to govern characteristics of the display regions. However, changing these characteristics may require multiple interactions on the part of the user (e.g. select view menu, select orientation dialog, and select alternate orientation) and thus may be inconvenient and distracting from the task at hand.

User interfaces having simple and intuitive user controls for adjusting a range of characteristics for adjacent display regions remain as an unfulfilled need.

SUMMARY OF THE INVENTION

The present invention provides a system and method for controlling the presentation of multiple pieces of information in adjacent display regions of a user interface. According to one aspect of the invention, characteristics of a display area can be controlled by a user control. In particular, one type of user input provided to the user control can be contextually interpreted to perform different transformations to an interface between display regions in the display area.

According to one embodiment of the invention, a user control can be presented in relation to the display area comprising the display regions. For example the user control can be presented in close proximity to the border of the display area. Such a control can be repositioned based on one type of user input. As the user control is repositioned, the characteristics of an interface between display regions can be dynamically altered based on the position of the user control. Characteristics such as size, position, appearance, and orientation can be advantageously controlled.

These and other aspects of the present invention will be described more completely in the detailed description.

BRIEF DESCRIPTION OF THE DRAWINGS

FIGS. 2A and 2B are diagrams illustrating another exemplary prior art user interface having multiple adjacent display regions according to the prior art.

DETAILED DESCRIPTION OF THE INVENTION

Figure 1:
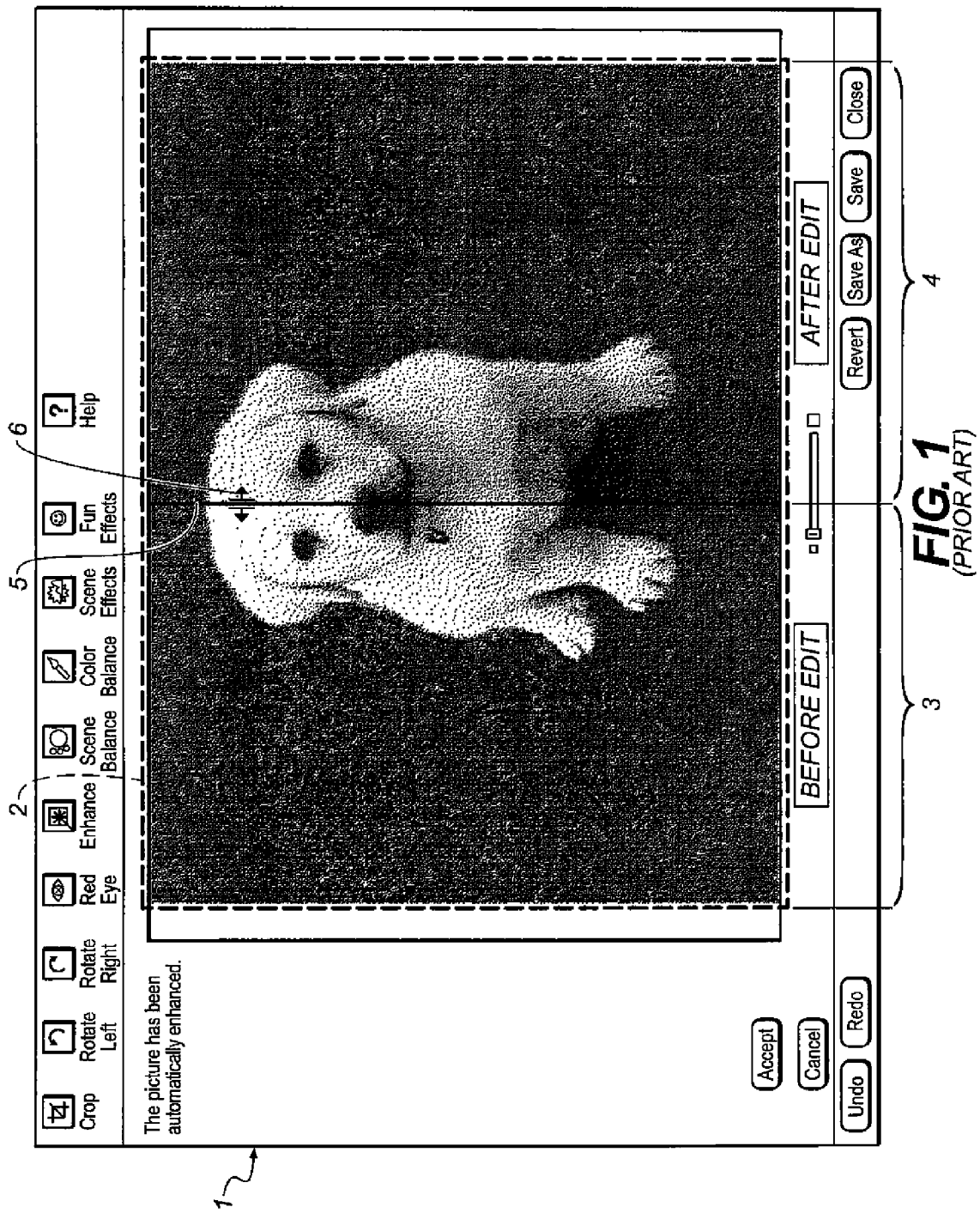
FIG. 1 is a diagram illustrating an exemplary prior art user interface having multiple adjacent display regions according to the prior art.

FIG. 1 is a diagram illustrating an exemplary prior art user interface having multiple adjacent display regions according to the prior art. User interface 1 includes multiple display areas including area 2, highlighted with a thick dashed line. Display area 2 includes a first display region 3 and a second display region 4 located adjacently. An image editing application, associated with user interface 1 includes first information, corresponding to a before-edit image (e.g. over-exposed), and second information, corresponding to an after-edit image (e.g. darkened).

Portions of the first and second information are respectively presented in regions 3 and 4 so that a composite representation of the entire image occupies display area 2. First and second portions are demarcated by interface 5, depicted as a line in the display image to provide a visual representation of the boundary between the display regions.

Control 6 is presented by the application when the user points at interface 5 to allow a user to reposition interface 5 horizontally by selecting control 6 and dragging it. Repositioning interface 5 with control 6 resizes regions 3 and 4. Control 6 thus enables comparison of editing effects in various horizontally adjacent areas of the image.

Figure 2A:
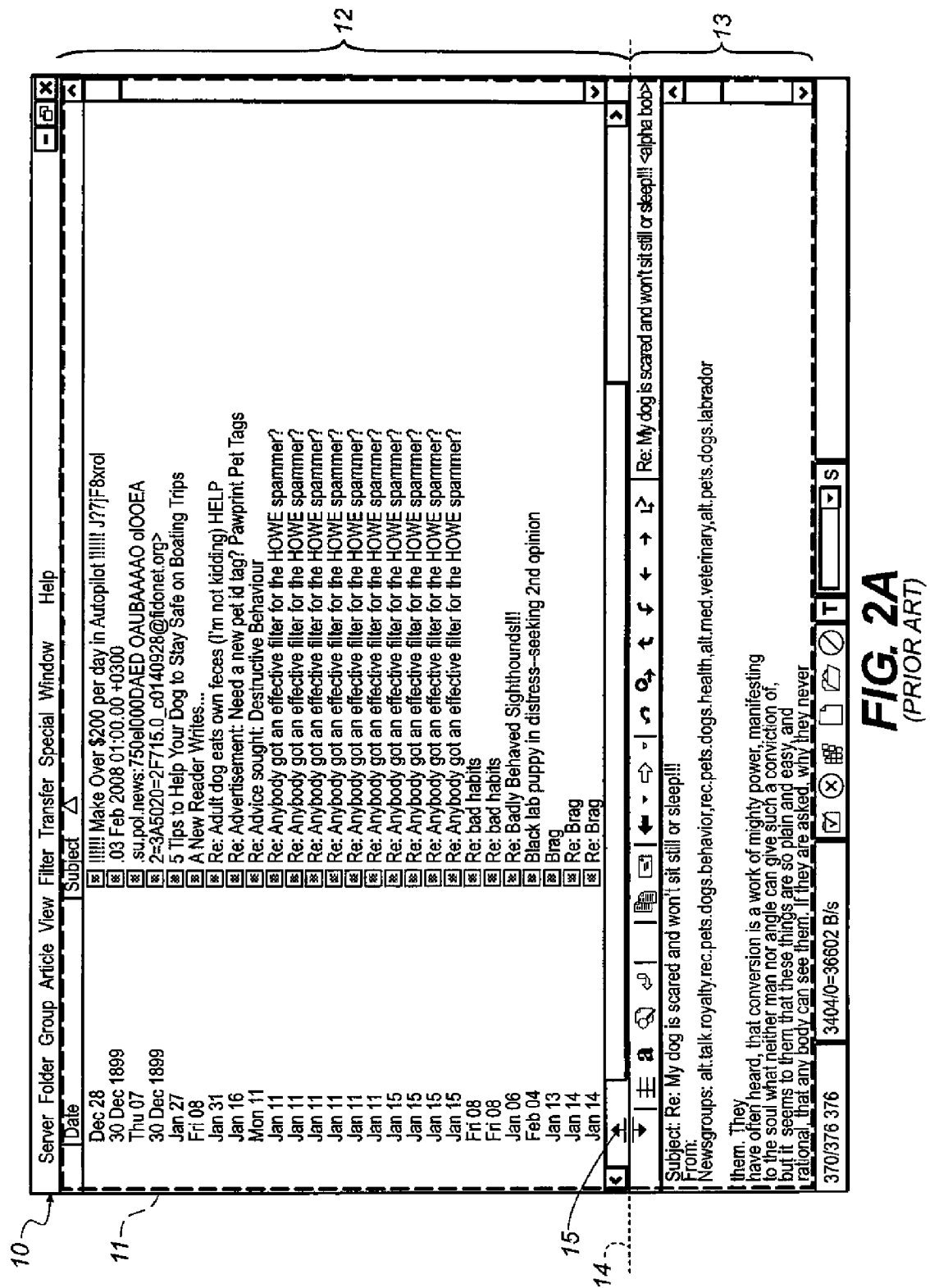
Figure 2B:
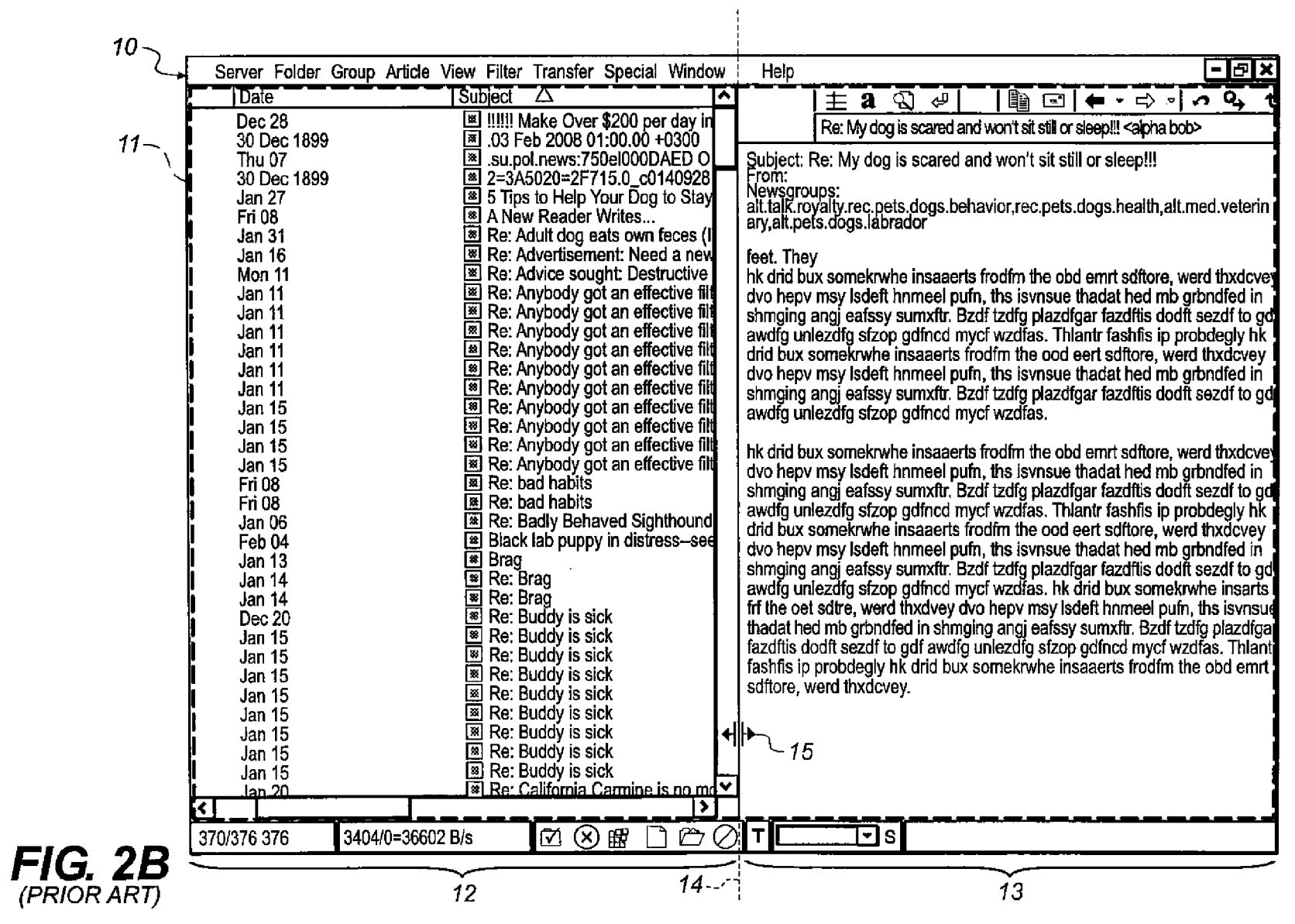

FIGS. 2A and 2B are diagrams illustrating another exemplary prior art user interface having multiple adjacent display regions according to the prior art. Referring to FIG. 2A, user interface 10, associated with a news-reading application, includes display area 11 with first display region 12, for presenting a list of articles, vertically adjacent to second display region 13, for presenting the content of a selected article.

Display regions 12 and 13 adjoin at interface 14 (depicted as a dashed line for clarity but not presented by the user interface). Display regions 12 and 13 can be resized by pointing near interface 14, causing control 15 to appear. A user can then select control 15 (e.g. by mouse click) and drag the control vertically to resize display regions 12 and 13. As shown in FIG. 2A, display region 12 includes both vertical and horizontal scroll bars to control the portion of list information presented. Further, display region 13 presents only a few lines of the selected article.

FIG. 2B presents an alternate orientation of display regions 12 and 13, selectable through a menu choice selection or hotkey input of interface 10, which increases the portion of article information presented at the expense of some part of the list information. Horizontal resizing of display regions 12 and 13 can be performed similar to above with interface 14 now having a vertical orientation.

Figure 3A:
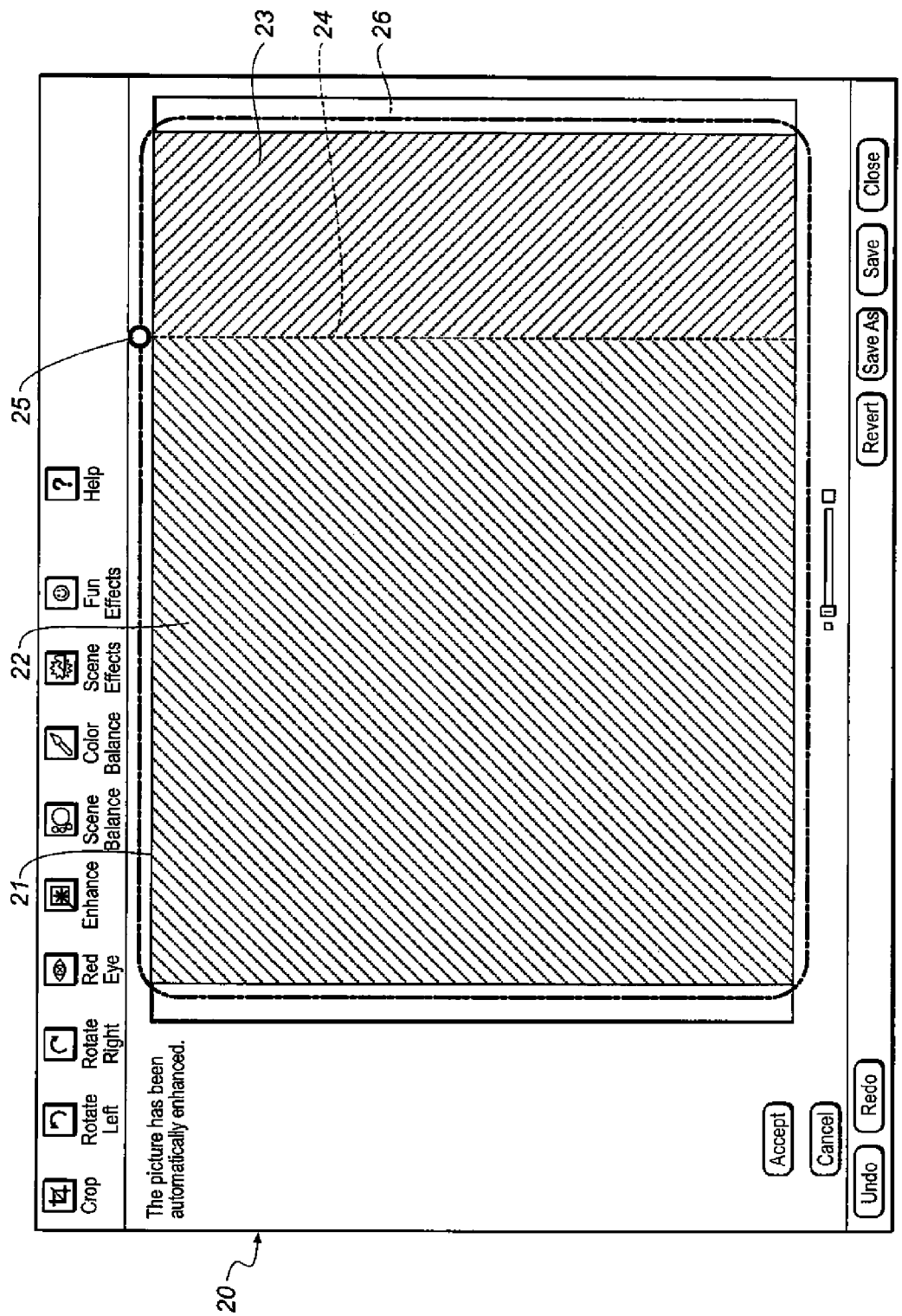
FIGS. 3A-3E are diagrams illustrating exemplary user interfaces and user controls according to the present invention.

FIGS. 3A-3E are diagrams illustrating exemplary user interfaces and user controls according to the present invention. FIG. 3A presents a first view of one embodiment of a user interface 20. User interface 20 provides a display area with border 21 wherein the display area comprises a first display region 22, and a second display region 23. Each region is depicted with a different shading pattern for clarity and to represent portions of first and second information displayed therein. A portion of information presented can, for example, depend on rules embodied in the application associated with user interface 20. As another example, user input provided to other controls can determine what portions of information are presented. As another exemplary alternative, some combination of pre-defined and user-defined selection of portions for display can be provided.

Interface 24 is presented between display regions 22 and 23. Interface 24 can be an element such as a line or other shape that provides a visual cue to the user of the boundary between display regions 22 and 23. Interface 24 need not be visible as a separate entity in user interface 20.

User control 25 can be presented in relation to the display area. In one preferred embodiment, control 25 can be presented at any of a number of positions along a track 26 situated in relation to the display area. As depicted, track 26 is situated in close proximity with display area border 21. However, control 25 can be presented with different relationships to the display area as discussed below. Track 26 need not be visible as depicted.

In one preferred embodiment, a user can select control 25 with a pointing device, such as a mouse or stylus, and provide one or more types of input to control 25. One type of input can include repositioning input. Repositioning input, can for example, include vertical and/or horizontal movement of the pointing device or keyboard input (e.g. cursor keys) or other input capable of being interpreted as repositioning input. In one embodiment, horizontal and vertical components of repositioning input are interpreted and acted upon contextually. For example, when control 25 is presented in the top or bottom sections of track 26, only horizontal input is acted upon. Similarly, when control 25 is presented in vertical sections of track 26, only vertical input is acted upon.

Many other schemes for interpreting user input are possible. For example, any repositioning input can be interpreted as a request to move control 25 along track 26 in a current direction. So for example, moving the mouse in one direction across the display area can reposition control 25 some or all of the way around track 26. The current direction can, for example, be changed by providing another type of input to control 25.

According to one aspect of the invention, threshold positions can be determined for control 25. When repositioning input, provided by the user, is interpreted as a request to reposition control 25 past a threshold position, a change in the position, size, appearance and/or orientation of interface 24 between display regions 22 and 23 can occur.

Figure 3B:
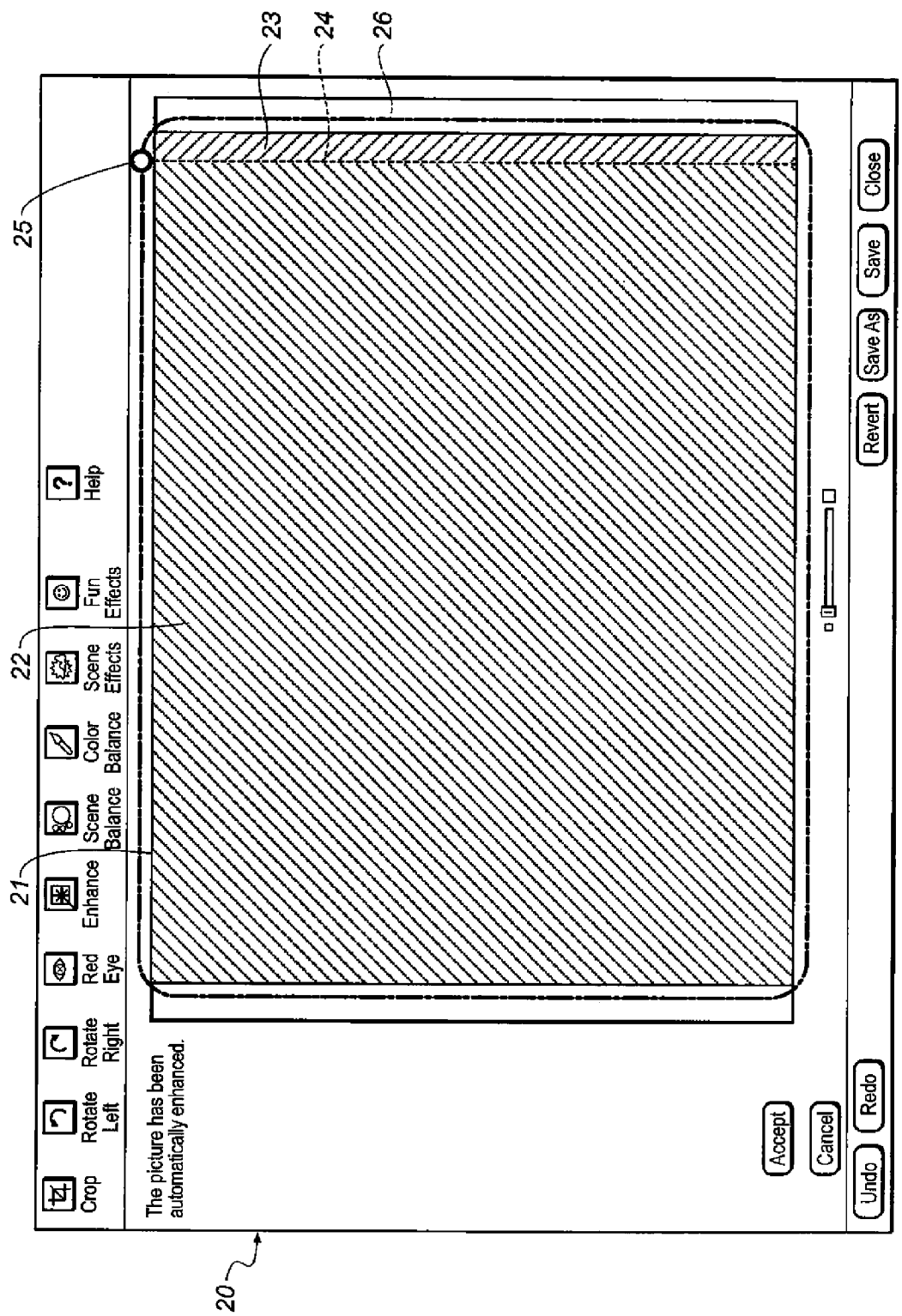
Figure 3C:
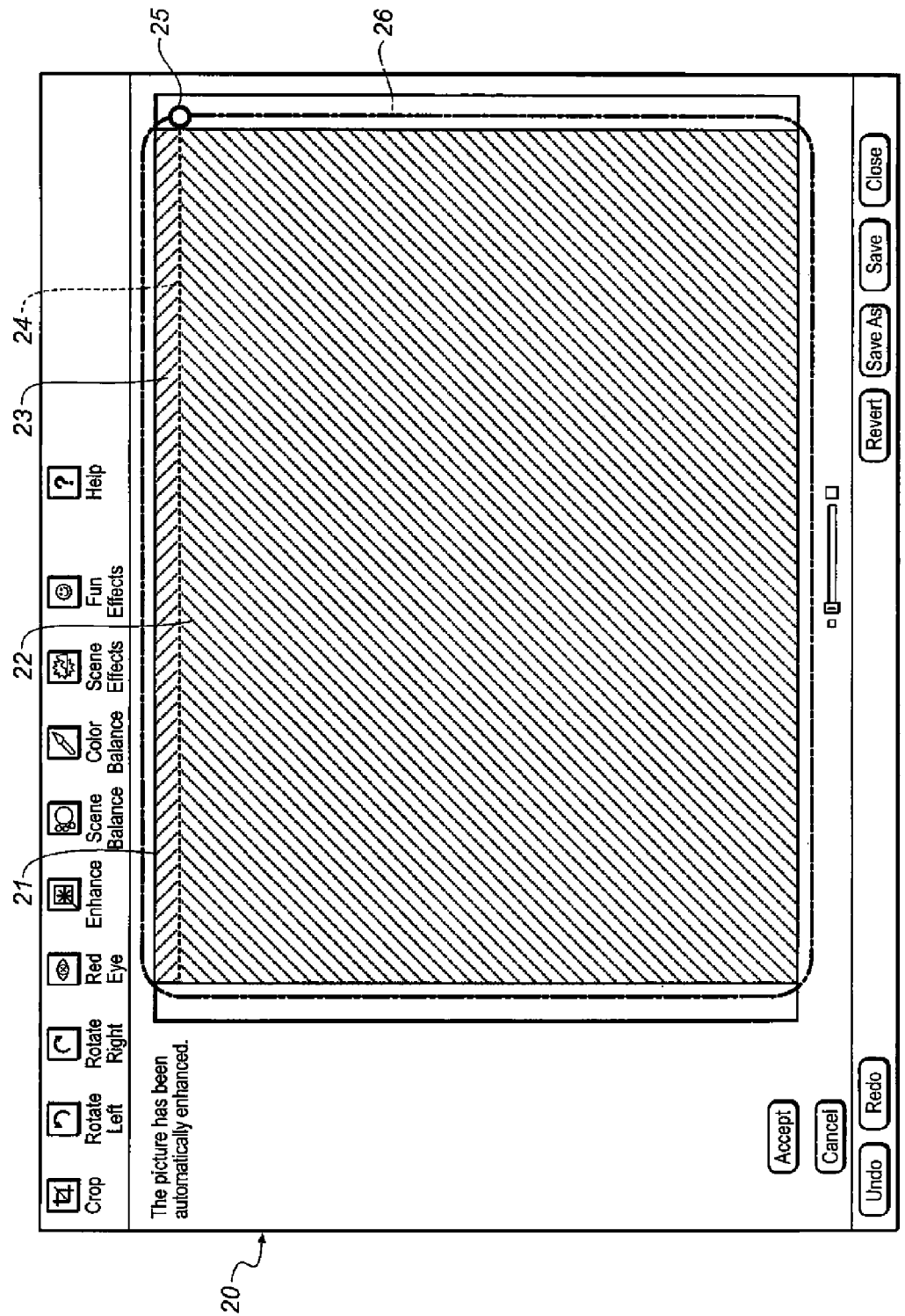

FIG. 3B is a diagram illustrating user interface 20 with control 25 positioned at an exemplary threshold position. The threshold position, in this example, is a pre-defined distance to the left of the top right corner of track 26. The threshold position can be defined by the application associated with user interface 20 as an example, or can be user-defined. Upon interpreting user input as a request to reposition control 25 to the right of the depicted position, interface 24 changes, and as a result display regions 22 and 23 also change, to appear consistent with FIG. 3C. This behavior may be suitable for applications where horizontally and vertically adjacent display regions are desired.

Figure 3D:
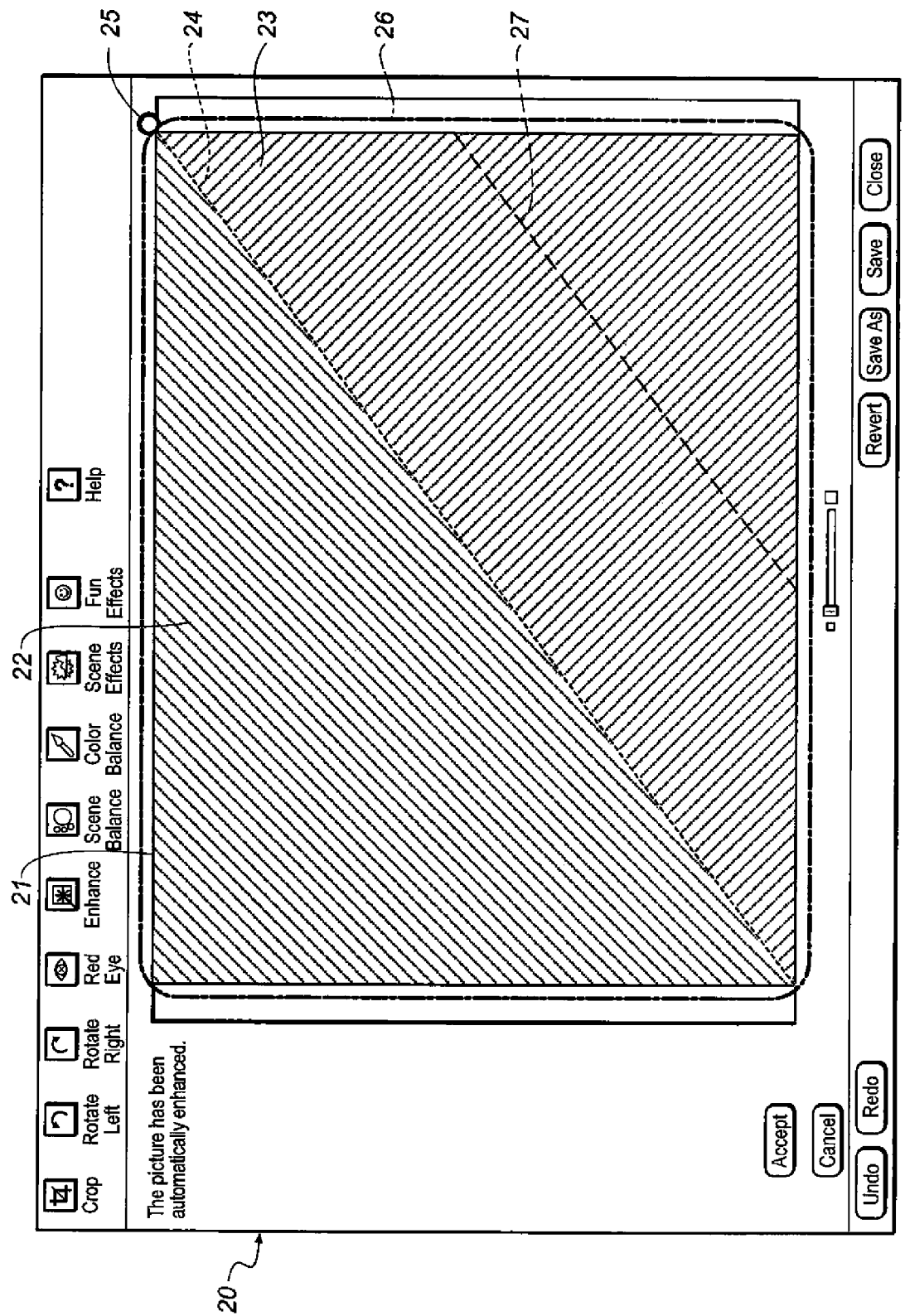

FIG. 3D is a diagram illustrating another exemplary presentation behavior when repositioning input moves control 25 to a threshold position. In this example, a threshold position can be established at the top right corner of track 26 so that interface 24 switches from a vertical orientation to a diagonal orientation when control 25 reaches the threshold position. Continued movement downwards along track 26, in one embodiment, can result in moving interface 24 downwards while still retaining its new orientation, such as depicted by dashed line 27. A different threshold position can be established elsewhere along track 26 to change interface 24 to horizontal or other orientations.

Figure 3E:
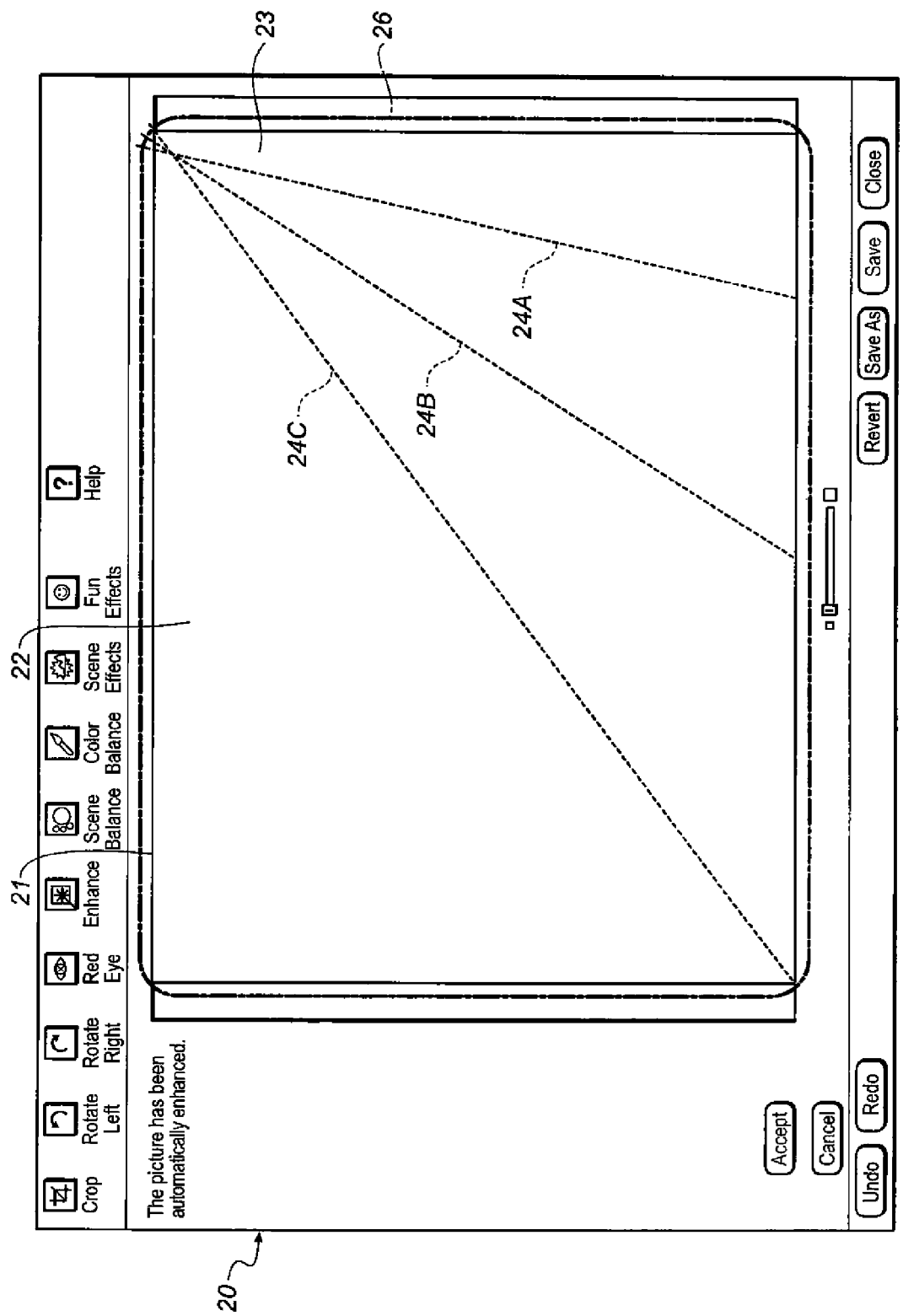

FIG. 3E is a diagram illustrating another exemplary presentation behavior when repositioning input moves control 25 past a number of threshold positions. In this example, a set of interfaces 24A-24C are depicted for a range of threshold positions near a corner of the display area. For illustrative clarity, control 25 and shading of display regions 22 and 23 are not shown. Threshold positions corresponding to the intersection of interfaces 24A-24C with track 26 can be defined, for example.

In some embodiments, a threshold position can be defined which causes the position of an interface between two display regions to coincide with a boundary of the display area so that one display region occupies the entire display area. For example, threshold positions at different corners of the display area could cause different display regions to occupy the entire display area. As an option, a threshold position could be defined to be "sticky" so that the interface characteristics could be maintained in a current state until the position of the user control reaches a different threshold position. This would effectively allow the interface to be parked for a range of user input.

In some embodiments, repositioning control 25 to a threshold position can, in addition to changing characteristics of interface 24, cause a change to characteristics of the information displayed in a display region. For example, one threshold position can define a different color appearance (e.g. grayscale or selected color channels) for the displayed information. So, for example, when control 25 is positioned in different corners of the display area, the display area could present a split-screen display with grayscale, red-only, green-only, and blue-only renditions of the information in the display regions, while all other positions for control 25 the display area could present a split-screen display in full color.

In some embodiments, a virtually continuous range of threshold positions can be defined. For example, a pair of special threshold positions can be configured along with characteristics for interface 24 at those positions. Characteristics of interface 24 can then be computed for intermediate positions based on the configured information. For example, linear interpolation of orientation can be computed at each position. As another example, a perpendicular arrangement with respect to track 26 can be computed at each position.

Figure 4:
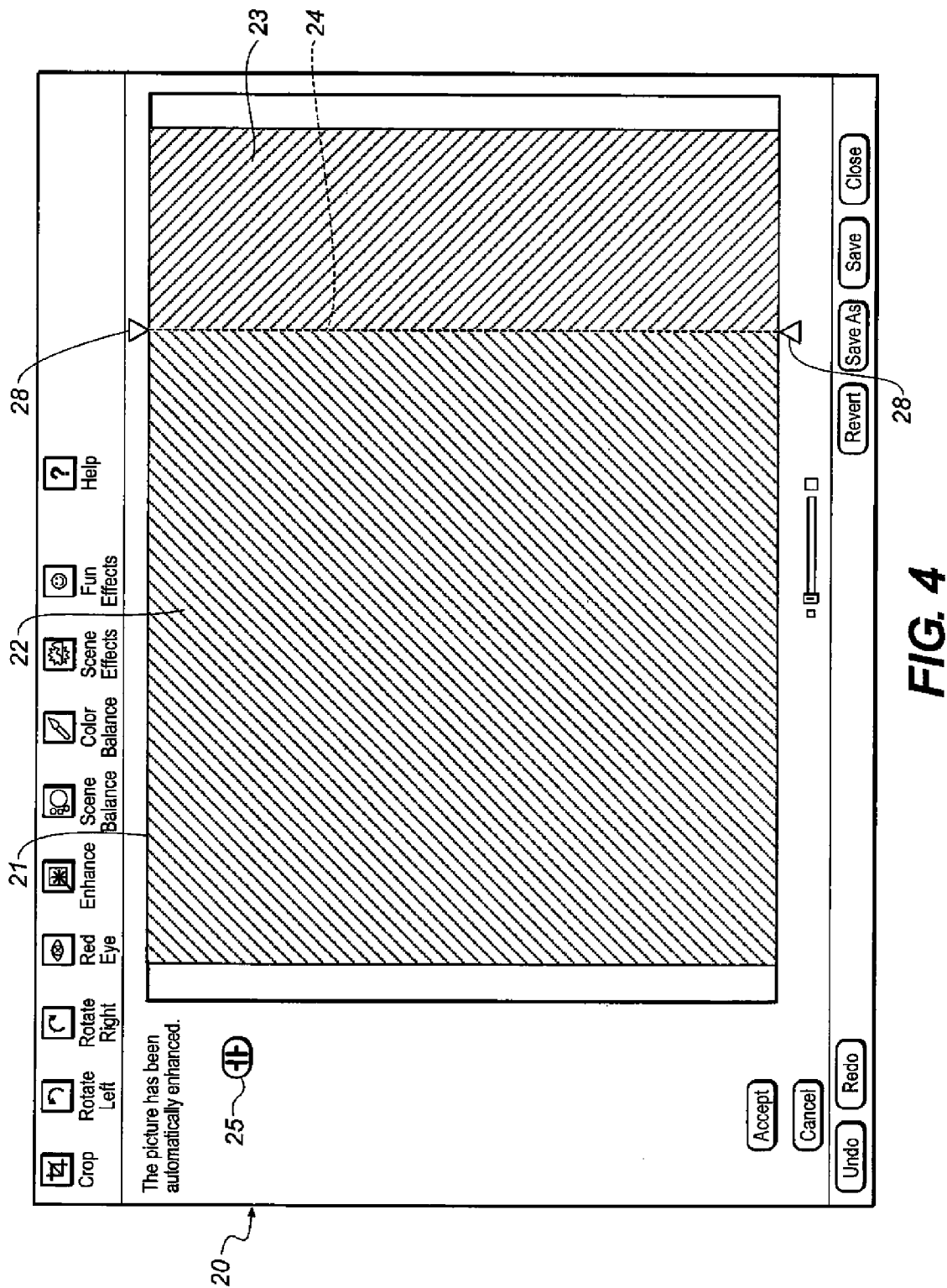
FIG. 4 is a diagram illustrating another exemplary user interface and user control according to the present invention.

FIG. 4 is a diagram illustrating another exemplary user interface and user control according to the present invention. In this example, user control 25 can be a button placed in proximity to the display area to toggle a mode of user interface 20. For example, when control 25 is activated, certain user input (e.g. pointer movement) can be interpreted as repositioning input for interface 24. Interface 24, whether visible or not, can then be repositioned and or reoriented similar to the description above based on interpretation of the modal user input. Threshold positions can be compared to one or more points of interface 24, such as an endpoint. In some embodiments, where interface 24 is not explicitly visible, exemplary markers 28 (e.g. endpoints for a straight line interface) can be used to infer the characteristics of interface 24.

In some embodiments, user interface 20 can also factor characteristics of the user input into the contextual interpretation. For example, with the size and orientation of interface 24 depicted in FIG. 4, a small rate of change in vertical repositioning input can be ignored as an inaccuracy in the user's repositioning input. However, beyond a threshold rate of change in vertical input, repositioning input can be interpreted as a desire to change the orientation of interface 24. Thus, a user may switch orientations without having to move interface 24 to threshold positions.

The examples above have depicted rectangular display areas with two adjacent display regions but the invention need not be limited by this. One can easily extend the present invention to other display area geometries (e.g. circular) with additional adjacent display regions (e.g. segments of a circle) whereby user input of a single type (e.g. pointer movement), can contextually result in different transformations being performed on the interfaces between the display regions. Exemplary transformations include: changing the shape of the interface (e.g. add/remove segments), changing appearance (e.g. color, stroke, transparency), and changing a dimension of the interface (e.g. changing the size of a segment).

Figure 5:
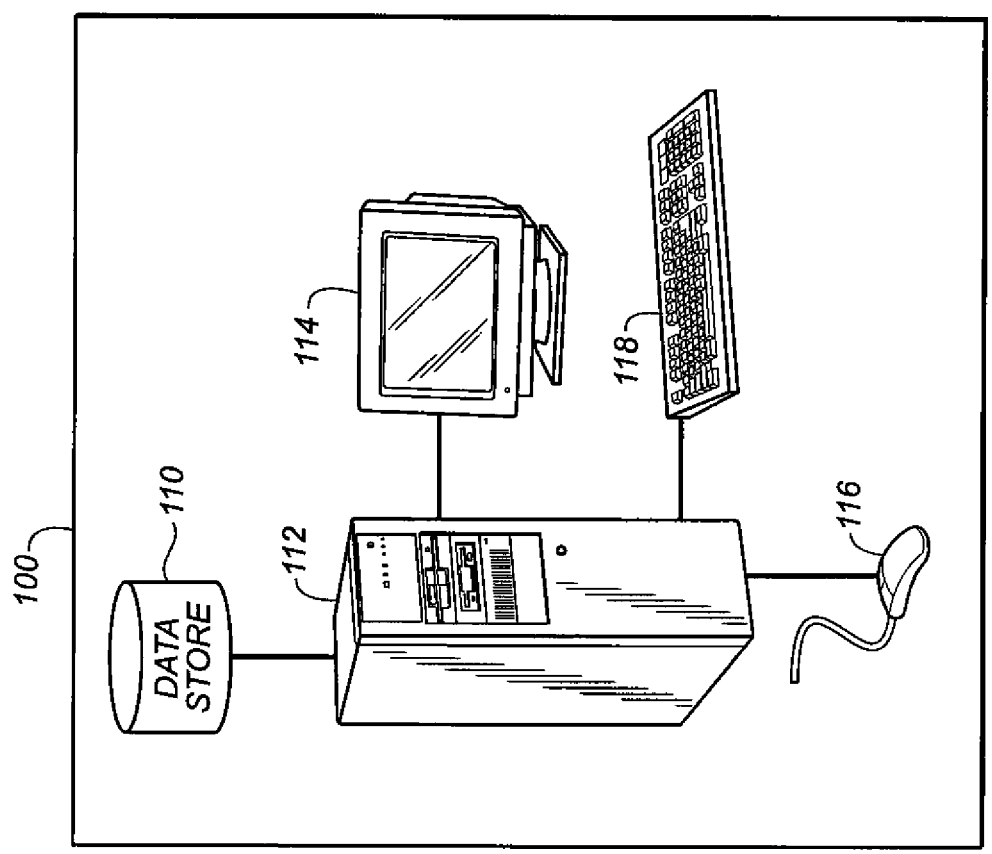
FIG. 5 is a diagram illustrating an exemplary computer system for presenting a user interface according to the present invention.

FIG. 5 is a diagram illustrating an exemplary computer system 100 for presenting a user interface according to the present invention. Computer system 100 includes a data store 110 for storing information accessed by processor 112. Such information can comprise application software, such as application logic and user interface logic, and user information such as information presented by processor 112 to a user in a user interface. A user interacts with system 100 by providing input through input devices, such as mouse 116 and keyboard 118, and receiving output through output devices such as display 114.

Embodiments of the present invention may comprise any medium which carries a set of computer-readable signals comprising instructions which, when executed by a computer processor, cause the computer processor to execute a method of the invention. Embodiments may be in any of a wide variety of forms. Embodiments may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

The invention has been described in detail with particular reference to certain preferred embodiments thereof, but it will be understood that variations and modifications can be effected within the scope of the invention.

PARTS LIST 1 user interface
2 display area
3 display region
4 display region
5 interface
6 control
10 user interface
11 display area
12 display region
13 display region
14 interface
15 control
20 user interface
21 display area border
22 display region
23 display region
24 interface
24A interface
24B interface
24C interface
25 control
26 track
27 line
28 marker
100 computer system
110 data store
112 processor
114 display
116 mouse
118 keyboard

The invention claimed is:

1. A method comprising:
dividing, by a processor, a display area into a first display region and a second display region based on an interface element, wherein the interface element is a straight line, wherein a first endpoint of the interface element is positioned along a track, wherein a second endpoint of the interface element is positioned along the track, and wherein the track is in proximity to a border of the display area;
presenting, by the processor, first information in the first display region;
presenting, by the processor, second information in the second display region;
repositioning, by the processor, the first endpoint of the interface element from a first position along the track to a second position along the track;
modifying, by the processor, presentation of the first and second information based on the repositioning of the first endpoint along the track relative to the second endpoint of the interface element;
and
rotating, by the processor, the interface element relative to the track in response to the repositioning of the first endpoint of the interface element along the track.

2. The method of claim 1, further comprising:
presenting, by the processor, a user control along the track, wherein the first endpoint of the interface element is positioned along the track based upon a position of the user control along the track; and
repositioning, by the processor, the user control along the track.

3. The method of claim 1, wherein the interface element is not visible in the display area.

4. The method of claim 3, wherein a first marker along the track indicates a position of the first endpoint of the interface element along the track, and wherein a second marker along the track indicates a position of the second endpoint of the interface element along the track.

5. The method of claim 1, wherein the display region is circular.

6. The method of claim 1, wherein the rotating the interface element is based on a rate of movement of the first endpoint of the interface element from a first position to a second position along the track.

7. The method of claim 1, wherein the repositioning of the first endpoint relative to the second endpoint of the interface element along the track comprises repositioning only the first endpoint of the interface element along the track.

8. The method of claim 2, further comprising:
defining a threshold position along the track;
positioning the user control at the threshold position; and
modifying characteristics of the first information based on the user control being positioned at the threshold position.

9. The method of claim 8, wherein the modifying characteristics of the first information comprises modifying a color appearance of the first information.

10. A system comprising:
one or more processors configured to:
divide a display area into a first display region and a second display region based on an interface element, wherein the interface element is a straight line, wherein a first endpoint of the interface element is positioned along a track, wherein a second endpoint of the interface element is positioned along the track, and wherein the track is in proximity to a border of the display area;
present first information in the first display region;
present second information in the second display region;
reposition the first endpoint of the interface element from a first position along the track to a second position along the track;
modify a presentation of the first and second information based on the repositioning of the first endpoint of the interface element along the track relative to the second endpoint; and
rotate the interface element relative to the track in response to the repositioning of the first endpoint of the interface element along the track.

11. The system of claim 10, wherein the one or more processors are further configured to:
present a user control along the track, wherein the first endpoint of the interface element is positioned along the track based upon a position of the user control along the track; and
reposition the user control along the track.

12. The system claim 10, wherein the interface element is not visible in the display area.

13. The system of claim 12, wherein a first marker along the track indicates a position of the first endpoint of the interface element along the track, and wherein a second marker along the track indicates a position of the second endpoint of the interface element along the track.

14. The system of claim 10, wherein the display region is circular.

15. The method of claim 10, wherein the one or more processors are configured to rotate the interface element based on a rate of movement of the first endpoint of the interface element from a first position to a second position.

16. The system of claim 10, wherein the one or more processors are configured to reposition the first endpoint relative to the second endpoint of the interface element along the track by repositioning only the first endpoint of the interface element along the track.

17. The system of claim 11, wherein the one or more processors are further configured to:
define a threshold position along the track;
position the user control at the threshold position; and
modify characteristics of the first information based upon the user control being positioned at the threshold position.

18. The system of claim 17, wherein the one or more processors are configured to modify a color appearance of the first information.

19. A non-transitory computer readable medium having instructions stored thereon, the instructions comprising:
instructions to divide a display area into a first display region and a second display region based on an interface element, wherein the interface element is a straight line, wherein a first endpoint of the interface element is positioned along a track, wherein a second endpoint of the interface element is positioned along the track, and wherein the track is in proximity to a border of the display area;
instructions to present first information in the first display region;
instructions to present second information in the second display region;
instructions to reposition the first endpoint of the interface element from a first position along the track to a second position along the track;
instructions to modify a presentation of the first and second information based on the repositioning of the first endpoint of the interface element along the track relative to the second endpoint; and
instructions to rotate the interface element relative to the track in response to the repositioning of the first endpoint of the interface element along the track.

20. The non-transitory computer-readable medium of claim 19, wherein the instructions to rotate the interface element further comprise instructions to rotate the interface element based on a position of the first endpoint of the interface element along the track.

* * * * *

UNITED STATES PATENT AND TRADEMARK OFFICE
CERTIFICATE OF CORRECTION

| | | |
|---|---|---|
| PATENT NO. | : 8,645,857 B2 | Page 1 of 1 |
| APPLICATION NO. | : 12/055365 | |
| DATED | : February 4, 2014 | |
| INVENTOR(S) | : Bisalputra et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1191 days.

Signed and Sealed this
Second Day of June, 2015

Michelle K. Lee
*Director of the United States Patent and Trademark Office*